US010545790B2

(12) United States Patent
Tao et al.

(10) Patent No.: US 10,545,790 B2
(45) Date of Patent: Jan. 28, 2020

(54) METHOD AND SYSTEM FOR PROCESSING DATA

(71) Applicant: EMC IP Holding Company LLC, Hopkingon, MA (US)

(72) Inventors: Simon Tao, Shanghai (CN); Yu Cao, Beijing (CN); Zhe Dong, Beijing (CN); Sanping Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 219 days.

(21) Appl. No.: 15/691,552

(22) Filed: Aug. 30, 2017

(65) Prior Publication Data
US 2018/0060118 A1 Mar. 1, 2018

(30) Foreign Application Priority Data
Aug. 30, 2016 (CN) .......................... 2016 1 0780989

(51) Int. Cl.
G06F 9/48 (2006.01)
G06F 16/901 (2019.01)

(52) U.S. Cl.
CPC .......... *G06F 9/4856* (2013.01); *G06F 9/4881* (2013.01); *G06F 16/9024* (2019.01)

(58) Field of Classification Search
CPC ................. G06F 9/5083; G06F 15/177; G06F 16/24542; G06F 16/24568; G06F 9/4881
See application file for complete search history.

(56) References Cited

U.S. PATENT DOCUMENTS

| 8,788,913 | B1 | 7/2014 | Xin et al. |
| 9,280,416 | B1 | 3/2016 | Xin et al. |
| 9,483,186 | B1 | 11/2016 | Lewis et al. |
| 9,774,517 | B2 | 9/2017 | Wittenstein et al. |
| 9,934,390 | B2 | 4/2018 | Gile |
| 2006/0218123 | A1* | 9/2006 | Chowdhuri ....... G06F 16/24532 |
| 2008/0062886 | A1* | 3/2008 | Tang ....................... H04L 47/70 370/252 |
| 2012/0166417 | A1* | 6/2012 | Chandramouli .. G06F 16/24568 707/713 |
| 2014/0344453 | A1* | 11/2014 | Varney ................ H04L 41/0803 709/224 |
| 2015/0134795 | A1* | 5/2015 | Theimer ............... G06F 16/254 709/223 |
| 2016/0259661 | A1* | 9/2016 | Tasoulas ............. G06F 9/45558 |

* cited by examiner

Primary Examiner — Dong U Kim
(74) Attorney, Agent, or Firm — BainwoodHuang

(57) ABSTRACT

Embodiments of the present invention relates to a method and system for processing data. Specifically, there is provided a method for processing data, comprising: in response to receiving an adjustment request for adjusting the number of consumer instances from a first number to a second number, determining an adjustment policy on adjusting a first distribution of states associated with the first number of consumer instances to a second distribution of the states associated with the second number of consumer instances, the states being intermediate results of processing the data; migrating the states between the first number of the consumer instances and the second number of the consumer instances according to the adjustment policy; and processing the data based on the second distribution of the states at the second number of the consumer instances. In other embodiments, there are further provided a device and system for processing data.

20 Claims, 15 Drawing Sheets

METHOD AND SYSTEM FOR PROCESSING DATA

RELATED APPLICATIONS

This application claim priority from Chinese Patent Application Number CN201610780989.1, filed on Aug. 30, 2016 at the State Intellectual Property Office, China, titled "METHOD AND SYSTEM FOR PROCESSING DATA" the contents of which is herein incorporated by reference in its entirety.

FIELD

Various embodiments of the present invention relate to data processing, and more specifically, to a method and system for processing stream data in parallel.

BACKGROUND

With the development of data processing techniques, data processing is no longer limited to serial processing, but it is feasible to perform parallel processing across multiple nodes in a distributed processing system. For an application involving big data processing, distributed parallel processing may greatly increase the data processing efficiency and further provide more support for real-time data processing.

Real-time data processing may be applied to multiple application environments. For example, real-time monitoring has become an important application hotspot nowadays. A large amount of video stream data will be generated during monitoring important areas such as city roads, main transport hubs and so on. For another example, large amounts of real-time monitoring stream data (e.g., sampled at intervals of 1 second) on temperature, humidity and so on will also be generated in fields of environment monitoring, production line monitoring, etc. Since the amounts of information carried by these stream data vary, it is highly possible that the workload rockets at a certain moment and extra computing resources are required. At this point, it becomes a focus of research regarding how to dynamically process in parallel stream data more effectively.

SUMMARY

Therefore, it is desirable to develop and implement a technical solution for effectively processing stream data. It is desired that the technical solution can, without ceasing to process data, dynamically adjust the amount of computing resources involved in the data processing.

In one embodiment of the present invention, there is provided a method for processing data. In the method, in response to receiving an adjustment request for adjusting the number of consumer instances from a first number to a second number, an adjustment policy is determined on adjusting a first distribution of states associated with a first number of consumer instances to a second distribution of the states associated with a second number of consumer instances, the states being intermediate results of processing the data. The states may be migrated between the first number of the consumer instances and the second number of the consumer instances according to the adjustment policy. The data may be processed based on the second distribution of the states at the second number of the consumer instances.

In one embodiment of the present invention, there is provided a device for processing data, comprising: a determining module configured to, in response to receiving an adjustment request for adjusting the number of consumer instances from a first number to a second number, determine an adjustment policy on adjusting a first distribution of states associated with a first number of consumer instances to a second distribution of the states associated with a second number of consumer instances, the states being intermediate results of processing the data; a migrating module configured to migrate the states between the first number of the consumer instances and the second number of the consumer instances according to the adjustment policy; and a processing module configured to process the data based on the second distribution of the states at the second number of the consumer instances.

In one embodiment of the present invention, there is provided a system for managing a storage system, the system comprising: one or more processors; a memory coupled to at least one processor of the one or more processors; computer program instructions stored in the memory which, when executed by the at least one processor, cause the system to execute a method for processing data. In the method, in response to receiving an adjustment request for adjusting the number of consumer instances from a first number to a second number, an adjustment policy is determined on adjusting a first distribution of states associated with a first number of consumer instances to a second distribution of the states associated with a second number of consumer instances, the states being intermediate results of processing the data. The states may be migrated between the first number of the consumer instances and the second number of the consumer instances according to the adjustment policy. The data may be processed based on the second distribution of the states at the second number of the consumer instances.

With the technical solution of the present invention, the amount of computing resources like operator instances that are involved during processing data can be dynamically adjusted without ceasing the data processing. According to the embodiments of the present invention, the number of operator instances can be dynamically adjusted based on the size of a workload for processing data, for example, the number of consumer instances can be increased or reduced dynamically. Thereby, on the one hand the processing capacity can be increased so as to ensure real-time processing when the workload increases; on the other hand, the processing capacity that is no longer required can be released when the workload decreases.

BRIEF DESCRIPTION OF THE SEVERAL VIEWS OF THE DRAWINGS

Through the more detailed description in the accompanying drawings, the above and other objects, features and advantages of the embodiments of the present invention will become more apparent. Several embodiments of the present invention are illustrated schematically and are not intended to limit the present invention. In the drawings.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
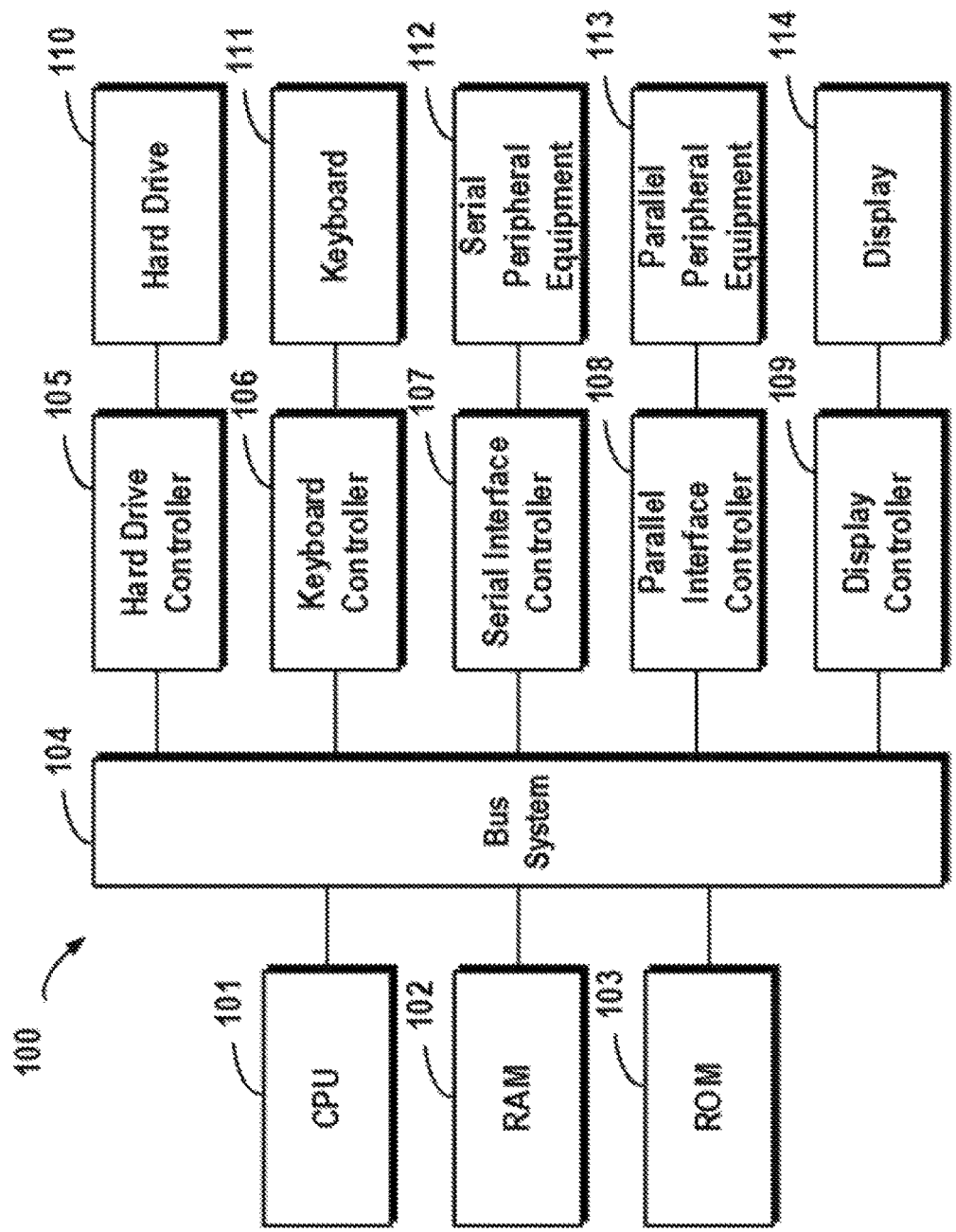
FIG. 1 schematically illustrates a block diagram of an exemplary computer system which is applicable to implement the embodiments of the present invention.

FIG. 1 illustrates an exemplary computer system 100 which is applicable to implement the embodiments of the present invention. As illustrated in FIG. 1, the computer system 100 may include: a CPU (Central Process Unit) 101, RAM (Random Access Memory) 102, ROM (Read Only Memory) 103, a System Bus 104, a Hard Drive Controller 105, a Keyboard Controller 106, a Serial Interface Controller 107, a Parallel Interface Controller 108, a Display Controller 109, a Hard Drive 110, a Keyboard 111, a Serial Peripheral Equipment 112, a Parallel Peripheral Equipment 113 and a Display 114. Among above devices, the CPU 101, RAM 102, ROM 103, Hard Drive Controller 105, Keyboard Controller 106, Serial Interface Controller 107, Parallel Interface Controller 108 and Display Controller 109 are coupled to the System Bus 104. The Hard Drive 110 is coupled to the Hard Drive Controller 105. The Keyboard 111 is coupled to the Keyboard Controller 106. The Serial Peripheral Equipment 112 is coupled to the Serial Interface Controller 107. The Parallel Peripheral Equipment 113 is coupled to the Parallel Interface Controller 108. And, the Display 114 is coupled to the Display Controller 109. It should be understood that the structure as illustrated in FIG. 1 is only for the exemplary purpose rather than any limitation to the present invention. In some cases, some devices may be added to or removed from the computer system 100 based on specific situations.

Note FIG. 1 merely illustrates an example of the computer system which can provide computing resources for stream data processing, and those skilled in the art may further use other computer systems to process stream data. For example, a single physical computing device may be used, multiple physical computing devices may be used, and even one or more virtual machines may be used to provide computing resources. Or a logical computing node (e.g., application instance) with computing power which runs on a computing device may be used to provide computing resources.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Technical solutions have been proposed so far which can adjust computing resources allocated to a stream processing application. However, these technical solutions fail to increase or reduce computing resources at any time according to workloads during operation of the stream processing application, but the amount of allocated computing resources is fixed since the application is initiated. In addition, adjustment may be made to some extent in an existing system that supports to adjust the computing resource allocation at runtime, whereas such adjustment causes extra latency overhead and further is likely to introduce potential problems in failure detection and handling.

In view of the foregoing problems, it is desirable to develop a technical solution that can dynamically adjust computing resources at runtime of a stream processing application. Moreover, it is desired that the technical solution can be compatible with existing stream processing applications and realize dynamic adjustment in the case where the existing processing pattern is not changed as much as possible. In an existing stream processing system, typically data is dispatched based on an operator instance topology described with a Directed Acyclic Graph. Various operations such as filtering, transformation and aggregation may be applied on the data at various operators, and one operator may have multiple instances.

Throughout the context of the present invention, description will be presented to how to implement the embodiments of the present invention by taking an application for monitoring a city's traffic conditions as one example. Specifically, suppose input data of the application is video streams captured by a camera mounted above a certain intersection in the city, and the application aims at making statistics on occurrences of various models of vehicles passing through the intersection. Computing resources may be increased by adding operator instances, at which point one of problems is how to migrate an intermediate result (e.g., state) of processed data from an existing operation instance to a newly added instance. In addition, consideration should be given to how to coordinate operations between various instances.

In the stream processing application, the entire processing procedure may be split into multiple operations performed at various operators. The state may be described using a two-tuple, which comprises a key and an associated value. The operators in the DAG topology are connected by a data stream, and the two-tuple flows along the data stream from the upstream operator (or referred to as producer) instance to the downstream operator (or referred to as consumer) instance.

For example, regarding the foregoing application for making statistics on models of all vehicles, it may be split into two operations:

Operation 1: at the upstream operator (producer), monitor one-time occurrence of each model of vehicles in a video stream; and Operation 2: at the downstream operator (consumer), calculate the total count of occurrences of each model of vehicles.

Suppose there exist three models of vehicles: jeep, SUV and car. At this point, two-tuples at the upstream operator (producer) may be represented as (jeep, 1), (SUV, 1) and (car, 1) respectively, which indicate statistics is to be made on each occurrence of jeeps, SUVs and cars in the video at the producer respectively. The two-tuples at the downstream operator (consumer) may be represented as (jeep, countjeep), (SUV, count_suv) and (car, count_car) respectively, wherein countjeep, count_suv and count_car denote the statistical count of occurrences of jeeps, SUVs and cars in the previous surveillance video respectively. When receiving a state of a corresponding model of vehicles from the producer instance, the count value at the consumer instance may be increased by one. For example, when the state at the consumer instance is (jeep, 10) and at the consumer instance there is received a two-tuple (jeep, 1) from the producer instance, at this point the state at the consumer instance may be updated to (jeep, 11). In this way, various operator instances may execute corresponding operations and update corresponding two-tuples, and further complete the stream data processing.

Regarding the foregoing application of monitoring vehicles, there might exist a circumstance as below: since there is a small traffic flow at night, less operator instances are needed to make statistics on counts of occurrences of various models of vehicles in the video; during the rush hour, the traffic density increases greatly, so operator instances on the former scale can no longer meet the workload, and more operator instances need to be allocated to the application. Suppose currently only two operator instances execute operation 2 (i.e., only two operator instances are used to make statistics on counts of occurrences of various models of vehicles in the video), and when the traffic flow in the video increases, it is desirable to add another operator and execute operation 2 by the three instances in parallel.

Figure 2:
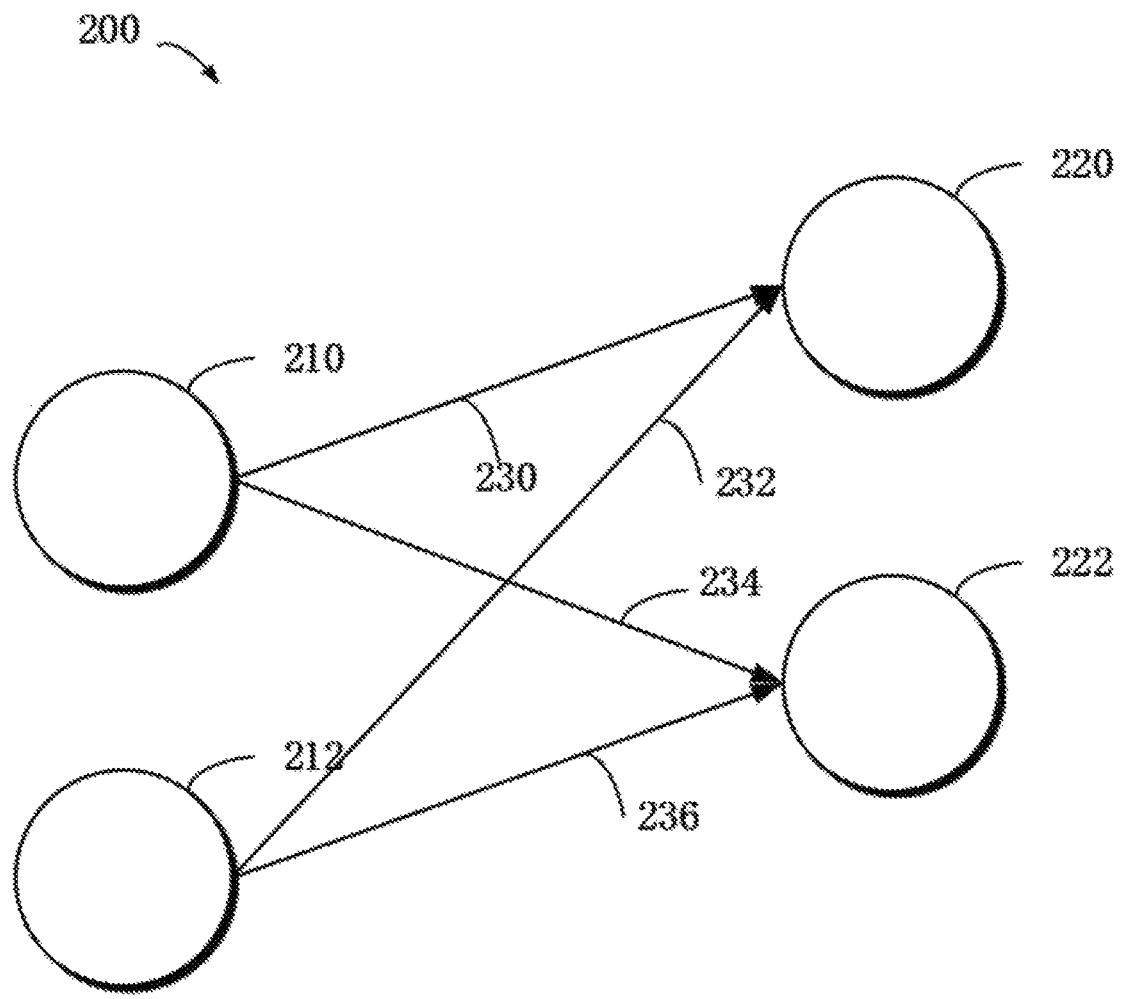
FIG. 2 schematically illustrates a diagram of Directed Acyclic Graph (DAG) topology according to one technical solution.

FIG. 2 schematically shows a diagram of DAG topology according to one technical solution. As shown in FIG. 2, reference numerals 210 and 212 denote two upstream producer instances in the DAG topology, e.g., instances for executing operation 1 in the foregoing example. FIG. 2 further comprises two downstream consumer instances 220 and 222 in the DAG topology, e.g., instances for executing operation 2 in the foregoing example.

The foregoing video data may be processed using the producer and consumer instances shown in FIG. 2. For example, the producer instances 210 and 212 may be used to monitor occurrences of each model of vehicles in the video data, and the consumer instances 220 and 222 may be used to make statistics on total occurrences of each model of vehicles. As shown in FIG. 2, the consumer instances 220 and 222 are directly connected downstream of the producer instances 210 and 212, and the producer instance 210 dispatches data and transfers states to the consumer instances 220 and 222 through channels 230 and 234; the producer instances 212 dispatches data and transfers states to the consumer instances 220 and 222 through channels 232 and 236.

Two producer instances and two consumer instances are involved in FIG. 2, and these instances can process video data in real time where the video data to be processed involves a smaller workload. However, during the rush hour, only these instances in FIG. 2 are possibly insufficient to complete real-time processing. At point more computing resources need to be allocated to the video processing application. For example, the shortage of computing resources at the consumer may be alleviated by adding consumer instances. Note FIG. 2 merely illustrates an example of one DAG topology for processing stream data, and when there is a need to handle more complex problems, the DAG topology may include more levels of producer instances and consumer instances. Those skilled in the art may design a more complex DAG topology as a concrete application environment requires.

Figure 3:
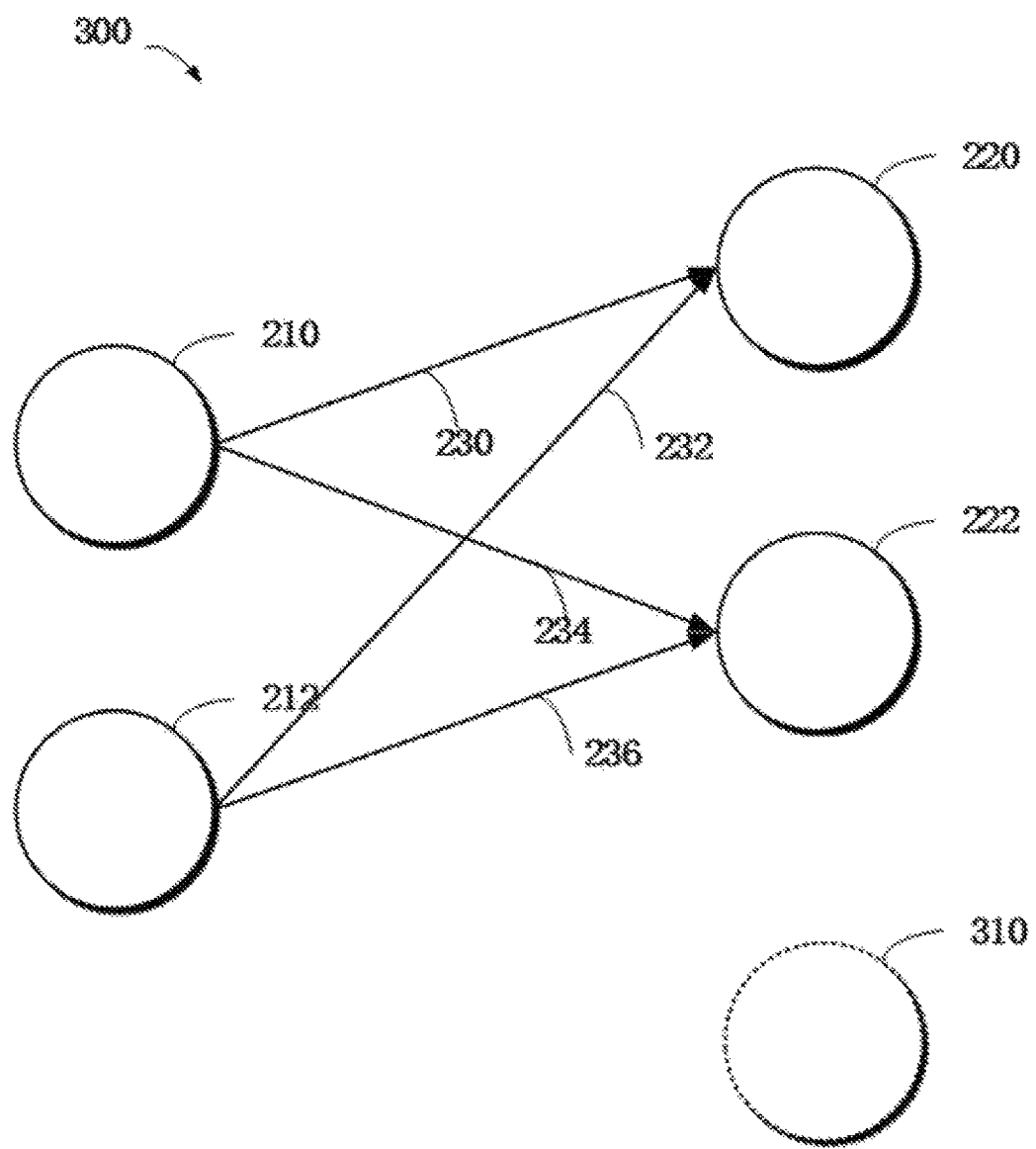
FIG. 3 schematically illustrates a block diagram of the process of adding a new consumer instance to the DAG topology according to one embodiment of the present invention.

FIG. 3 schematically shows a block diagram 300 of the process of adding a new consumer instance to a DAG topology according to one embodiment of the present invention. As shown in FIG. 3, to ease the shortage of computing resources, a new consumer instance 310 is added to share original operations of the consumer instances 220 and 222. At this point, since the new consumer instance 310 is just initiated and lacks a state associated with previous operations. First it needs to be determined which states are to be migrated from the consumer instances 220 and 222 to the consumer instance 310, such that the consumer instance 310 may be added in at run time.

To this end, the present invention provides a method for updating the number of operator instances in real time without interrupting an application. Specifically, there is proposed a method for processing data, comprising: in response to receiving an adjustment request for adjusting the number of consumer instances from a first number to a second number, determining an adjustment policy on adjusting a first distribution of states associated with the first number of consumer instances to a second distribution of the states associated with the second number of consumer instances, the states being intermediate results of processing the data; migrating the states between the first number of the consumer instances and the second number of the consumer instances according to the adjustment policy; and processing the data based on the second distribution of the states at the second number of the consumer instances.

Figure 4:
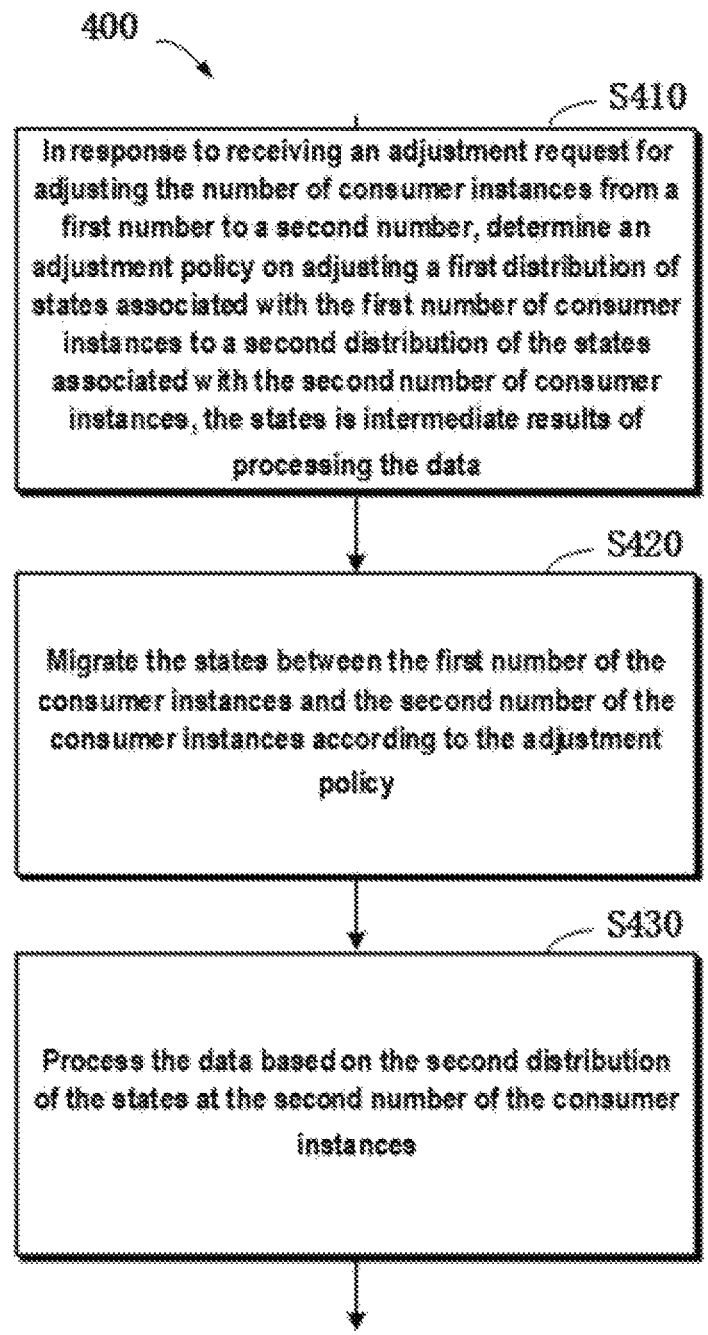
FIG. 4 schematically illustrates a flowchart of a method for processing data according to one embodiment of the present invention.

FIG. 4 schematically shows a flowchart 400 of a method for processing data according to one embodiment of the present invention. In step S410, in response to receiving an adjustment request for adjusting the number of consumer instances from a first number to a second number, an adjustment policy on adjusting a first distribution of states associated with the first number of consumer instances to a second distribution of the states associated with the second number of consumer instances is determined, the states being intermediate results of processing the data.

Continue the foregoing example of the video of monitoring the traffic. In this step the number of consumer instances may be adjusted from 2 as shown in FIG. 2 to 3 as shown in FIG. 3. Before the adjustment, states associated with two consumer instances will be transferred to the two consumer instances 220 and 222 respectively. When the new consumer instance 310 is added, states which used to be associated with the two consumer instances 220 and 222 need to be allocated to the three consumer instances 220, 222 and 310. At this point, different adjustment policies may be used. For example, a portion of the states associated with the consumer instance 220 may remain at the consumer instance 220, while a portion of the states associated with the consumer instance 222 may be partitioned into two blocks, with a first block maintaining at the consumer instance 222 and a second block migrated to the consumer instance 310. Or other policy may further be used, for example, a portion of states at the consumer instance 220 may be migrated to the consumer instance 310 and a portion of states at the consumer instance 222 may be migrated to the consumer instance 310, etc.

In the example as shown in FIG. 3, suppose states at the consumer instance 220 comprise two-tuples (jeep, count_jeep) and (SUV, count_suv), and a state at the consumer instance 222 comprises a two-tuple (car, count_car), then it may be determined the adjustment policy is: to migrate the states (SUV, count_suv) from the consumer instance 220 to the consumer instance 310. Note this adjustment policy is merely exemplary, and detailed description is presented below to how to determine an adjustment policy.

In step S420, the states are migrated between the first number of the consumer instances and the second number of the consumer instances according to the adjustment policy. In this step, the state (SUV, count_suv) may be migrated from the consumer instance 220 to the consumer instance 310. Note the states throughout the context of the present invention are intermediate data generated during processing data, e.g., the foregoing multiple two-tuples. Furthermore, "migrating states" as involved in the context of the present invention does not mean migrating each two-tuple in states, but only a portion of two-tuples may be migrated. Note since migrating two-tuples will cause extra time and computing overhead, it is necessary to reduce extra overhead caused by the migration as far as possible in the migration process; in other words, it is necessary to migrate as few two-tuples as possible.

In step S430, the data is processed based on the second distribution of the states at the second number of the consumer instances. In this step, for various two-tuples in the states, state migration has been completed based on the second distribution mode, so at this point the data may be processed by the second number of the consumer instances.

Figure 5A:
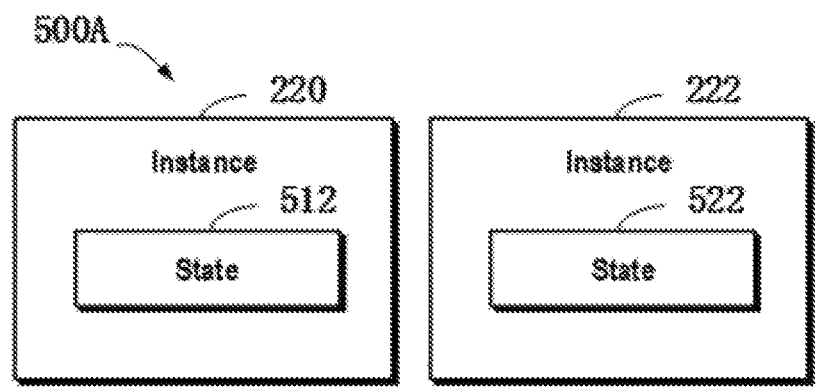
FIGS. 5A, 5B and 5C schematically illustrate schematic views of distributions of states in different phase of a method for processing data according to one embodiment of the present invention.
Figure 5B:
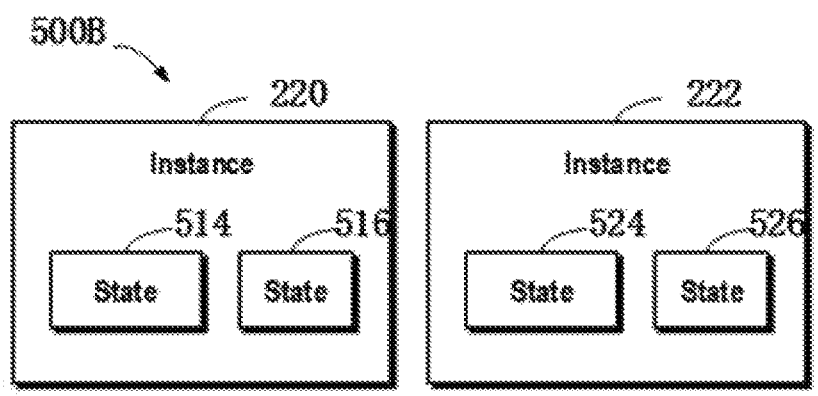
Figure 5C:
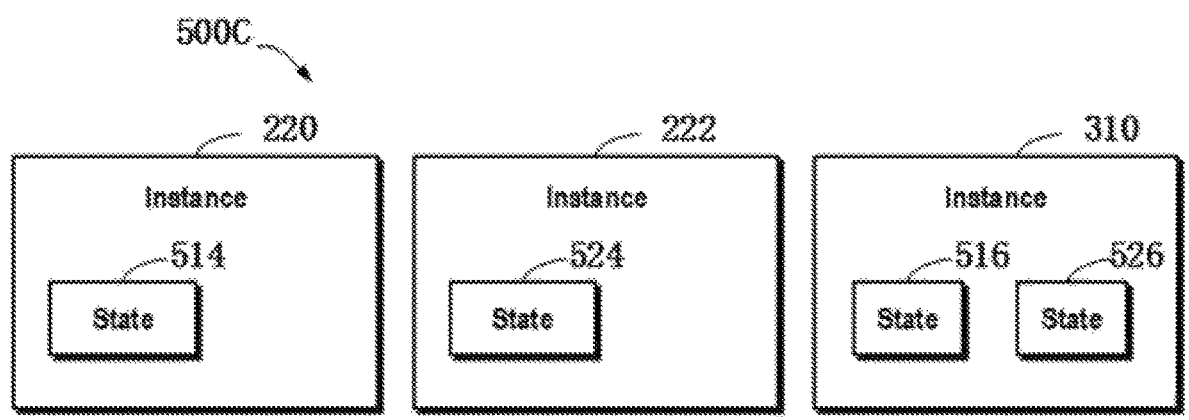

FIGS. 5A, 5B and 5C schematically show schematic views 500A, 500B and 500C of distributions of states in different phases of a method for processing data according to one embodiment of the present invention respectively. FIG. 5A schematically shows a state distribution associated with the two consumer instances 520 and 522. In the context of the present invention, the state distribution refers to a distribution of states at various instances. For example, the state distribution in the example shown in FIG. 5A may be: a state 512 is distributed at the consumer instance 220, and a state 522 is distributed at the consumer instance 222.

When it is determined the new consumer instance 310 is to be added, then the state distribution will change. At this point, a portion of states need to be migrated to the new consumer instance 310. Those skilled in the art may use various approaches to determine which portion of the states are to be migrated. As shown in FIG. 5B, the state 512 at the consumer instance 220 may be partitioned into two portions, i.e., states 514 and 516. Similarly, the state 522 at the consumer instance 222 may be partitioned into states 524 and 526. As shown in FIG. 5C, at this point an adjustment policy may be: the state 516 is to be migrated from the consumer instance 220 to the consumer instance 310, and similarly, the state 526 may be migrated from the consumer instance 220 to the consumer instance 310. In this way, at the second number of the consumer instances (i.e., the three consumer instances 220, 222 and 310), the data may be processed based on a new distribution of the states (the state 514 is at the consumer instance 220, the state 524 is at the consumer instance 222, and the states 516 and 526 are at the consumer states 310).

Continue the foregoing example of processing video data. Suppose initially two-tuples about counts of occurrences of 3 models of vehicles are included at the consumer instance 220, and two-tuples about counts of occurrences of another 3 models of vehicles are included at the consumer instance 222, then at this point an adjustment policy may be: a two-tuple about 1 model of vehicles is to be migrated respectively from the consumer instances 220 and 222 to the consumer instance 310. The state distribution after the migration is: two-tuples about total occurrences of 2 models of vehicles are included at each of the three consumer instances 220, 222 and 310 respectively.

It should be understood FIGS. 5A to 5C merely illustrate one adjustment approach, and in other embodiments those skilled in the art may use various approaches to determine how to partition and how to migrate. For example, only the states at the consumer instance 220 may be partitioned and migrated, while the states at the consumer instance 222 remain unchanged. Detailed description will be presented below to how to determine an adjustment policy.

In one embodiment of the present invention, the determining the adjustment policy comprises: determining migration overhead for migrating the first distribution of the states to the second distribution of the states; and determining the adjustment policy based on the migration overhead. In this embodiment, the adjustment policy may be determined based on migration overhead caused by the migration. Specifically, an approach to minimizing migration overhead may be chosen for determining the policy.

In one embodiment of the present invention, the determining the migration overhead comprises: determining the migration overhead based on a consistent hashing algorithm. If the state distribution is determined using a traditional hashing-mode method, when the number of consumer instances changes, a large number of states need to be migrated between consumer instances, and further latency and a bandwidth shortage will arise. Therefore, an approach to minimizing the migration overhead may be chosen. In one embodiment of the present invention, a consistent hashing algorithm may be used when determining the adjustment policy. When the number of consumer instances changes, only K/n of the states have to be migrated (wherein K is the total number of keys, and n is the number of adjusted consumer instances). In this way, the migration overhead can be decreased as much as possible, and further the latency caused by the state migration may be reduced.

Those skilled in the art may determine how to migrate two-tuples in states based on general principles of the consistent hashing algorithm. For more details of the consistent hashing algorithm, those skilled in the art may make reference to various documents known in the prior art, e.g., https://en.wikipedia.org/wiki/Consistent_hashing. Description of details will be ignored in the context of the present invention.

In one embodiment of the present invention, a message may be sent to various producer instances and consumer instances involved in the DAG topology, so as to notify the allocation of computing resources is to be adjusted. In order to expressly identify each adjustment at run time of the application, a unique identifier may be set for each adjustment so that consumer instances and producer instances can clearly identify which adjustment is currently being experienced.

Figure 6:
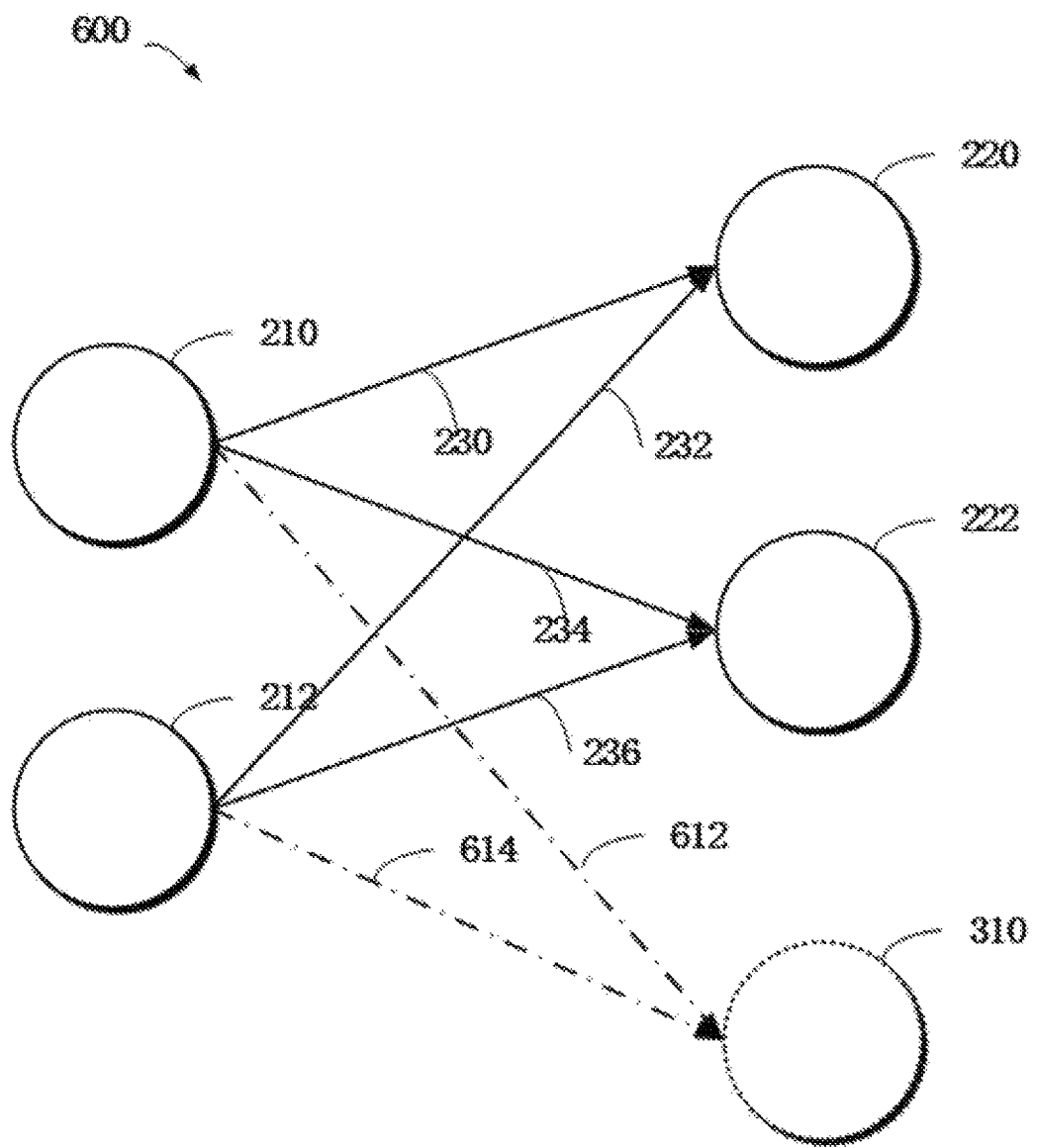
FIGS. 6 to 9 each schematically illustrate refined block diagrams of the process of a method for processing data according to one embodiment of the present invention.

FIG. 6 schematically shows a refined block diagram 600 of the process of a method for processing data according to one embodiment of the present invention. In FIG. 6, there are direct data connection channels between upstream producer instances (i.e., 210 and 212) and downstream consumer instances (i.e., 220 and 222). After the consumer instance 310 is added, an adjustment request may be sent to the producer instances 210, 212 and the consumer instances 220, 222.

In one embodiment of the present invention, before migrating the states, at a third number of producer instances upstream of the first number of consumer instances, an adjustment indicator is sent to the first number of the consumer instances, the adjustment indicator indicating that data to be dispatched after the adjustment indicator is dispatched according to the second distribution of the states.

In this embodiment, producer instances upstream of consumer instances need to send an adjustment indicator to the downstream consumer instances. The adjustment indicator may use various data structures so long as the downstream consumer instances can identify the adjustment indicator. For example, the adjustment indicator may be set as the foregoing unique identifier or may use any customized character string, e.g., "TB" etc.

In this embodiment, the "upstream" producer instances refer to all producer instances that are directly connected with the consumer instances before the adjustment, which will be described in detail with reference to FIG. 6. As shown in FIG. 6, the adjustment indicator may be sent along a data channel as below: from the producer instance 210 to the consumer instances 220 and 222 respectively, from the producer instance 212 to the consumer instances 220 and 222 respectively. In this way, each producer instance may notify the downstream consumer instances that data to be dispatched after the adjustment indicator is dispatched according to the second distribution (i.e., new distribution) of the states.

Since conditions of various data channels vary, times for which various adjustment indicators are transmitted on various data channels also vary, and further times when various consumer instances receive adjustment indicators may vary. An objective of the adjustment indicator is to explicitly notify the consumer instance whether data on the data channel is dispatched according to an old distribution of states (i.e., states are distributed at the two consumer instances 220 and 222) or dispatched according to a new distribution of states (i.e., states are distributed at the three consumer instances 220, 222 and 310).

In one embodiment of the present invention, after the adjustment indicator is sent, the data is dispatched from the third number of producer instances to the second number of consumer instances according to the second distribution of the states. Still with reference to FIG. 6, after the adjustment indicators are sent from the producer instances 210 and 212 to the consumer instances 220 and 222 respectively, the producer instance 210 dispatches data to the consumer instances 220, 222 and 310 along data channels 230, 234 and 612; and the producer instance dispatches data to the consumer instances 220, 222 and 310 along data channels 232, 236 and 614.

Note after the state migration, since a portion of states which used to be at the consumer instances 220 and 222 will be migrated to the newly added consumer instance 310, data associated with this migrated portion of states also needs to be dispatched to the consumer instance 310 so as to be processed by the consumer instance 310 based on the migrated states. Specifically, the data channel 612 and 614 shown by dashed lines in FIG. 6 may be used to dispatch data to the newly added consumer instance 310.

Note the adjustment indicator is a boundary of indicating whether data is dispatched according to an old distribution or a new distribution of states. If a consumer instance receives an adjustment indicator from all upstream producer instances, this means from the moment on the consumer instance will process data according to the new distribution of states, and also at this point an associated portion in the states need to be migrated according to the migration policy.

In one embodiment of the present invention, the migrating the states according to the adjustment policy comprises: in response to receiving, at a consumer instance among the first number of the consumer instances, an adjustment indicator from all upstream producer instances, migrating a relevant portion of the states from the consumer instance to an associated further consumer instance among the second number of the consumer instances according to the adjustment policy.

Figure 7:
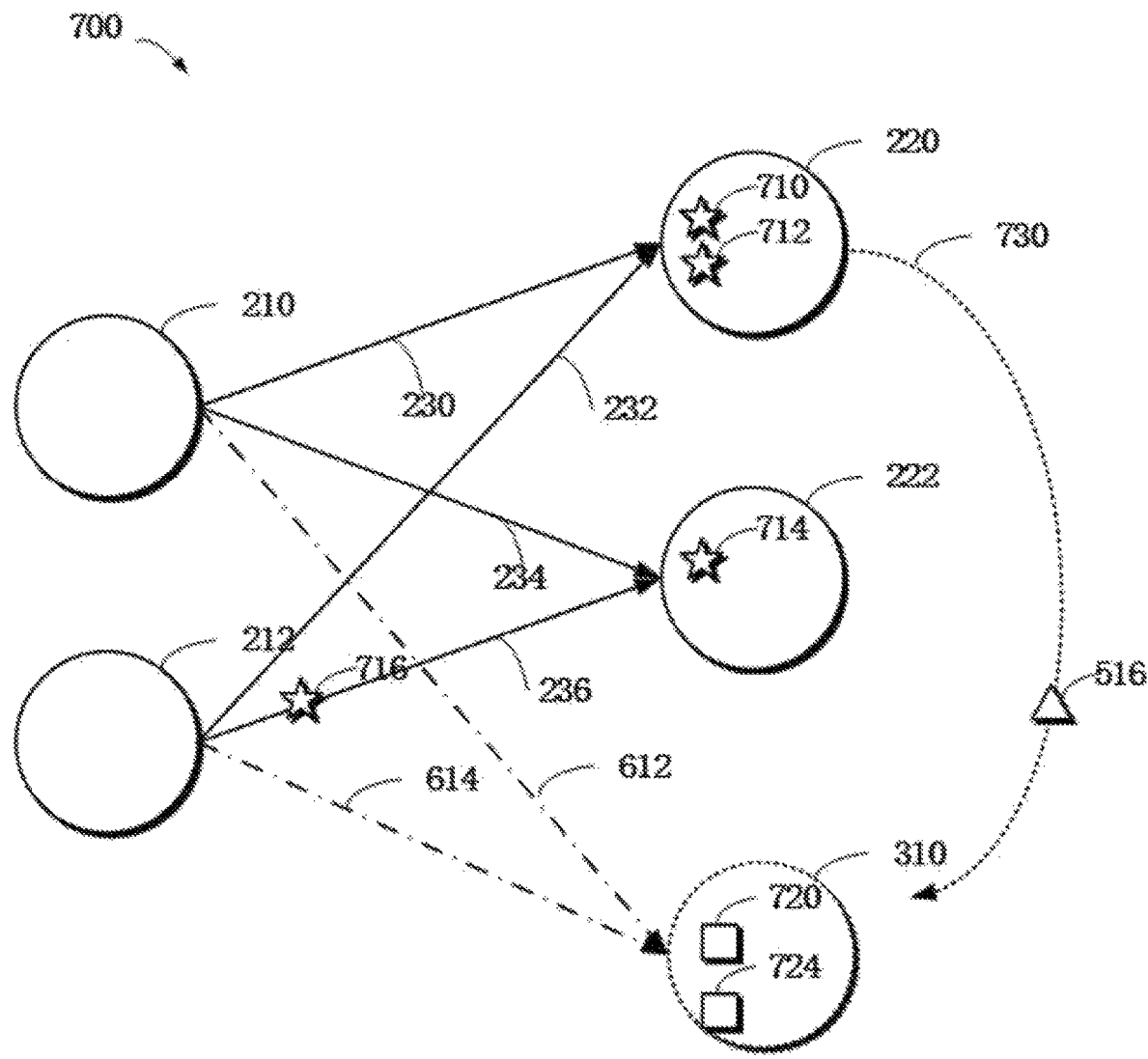

Detailed description is presented below to concrete steps of the foregoing embodiment with reference to FIG. 7. This figure schematically shows a refined block diagram 700 of the process of a method for processing data according to one embodiment of the present invention. As shown in FIG. 7, an adjustment indicator sent from a producer instance to a consumer instance is represented by a star.

Specifically, the producer instance 210 sends an adjustment indicator 710 to the consumer instance 220 via the data channel 230, and the adjustment indicator 710 has reached the consumer instance 220. The producer instance 212 sends an adjustment indicator 712 to the consumer instance 220 via the data channel 232, and the adjustment indicator 712 has reached the consumer instance 220. At this point, since the consumer instance 220 has received adjustment indicators from all the upstream producer instances 210 and 212, a relevant portion of the states are migrated from the consumer instance 220 to the newly added consumer instance 310 according to the adjustment policy. Continue the example in FIGS. 5A, 5B and 5C, a relevant portion of the states (i.e., a state 516) may be migrated from the consumer instance 220 to the consumer instance 310 (as shown by an arrow 730).

Description is presented below to migration operations associated with the consumer instance 222. As shown in FIG. 7, the producer instance 210 sends an adjustment indicator 714 to the consumer instance 222 via the data channel 234, and the adjustment indicator 714 has reached the consumer instance 222. The producer instance 212 sends an adjustment indicator 716 to the consumer instance 222 via the data channel 236, and the adjustment indicator 716 has not yet reached the consumer instance 222. At this point, since the consumer instance 222 has not received adjustment indicators from all the upstream producer instances 210 and 212, the consumer instance 222 has to wait. A relevant portion of the states are not migrated from the consumer instance 222 to the newly added consumer instance 310 according to the adjustment policy until adjustment indicators are received from all the upstream producer instances 210 and 222.

In one embodiment of the present invention, there is further comprised: before receiving, at the consumer instance, adjustment indicators from all the upstream producer instances, processing the data based on the first distribution of the states at the consumer instance. With reference to the consumer instance 222 in FIG. 7, detailed description is now presented to concrete actions of the consumer instance. As shown in FIG. 7, the consumer instance 222 has received the adjustment indicator 714 from the producer instance 210 and not yet received the adjustment indicator 716 from the producer instance 212. At this point, the consumer instance 222 needs to process the data according to the old distribution of the states.

Continuing the foregoing example, suppose the operation executed at the consumer instance 222 is to make statistics on counts of occurrences of three models of vehicles, then at this point states at the consumer instance 222 comprise (jeep, count_jeep), (SUV, count_suv) and (car, count_car). Before the consumer instance 222 receives adjustment indicators from all the upstream producer instances, the data needs to be processed according to the old distribution of the states, i.e., statistics needs to be made on counts of occurrences of three models of vehicles at the consumer instance 222.

In one embodiment of the present invention, there is further comprised: before receiving, at the consumer instance, adjustment indicators from all the upstream producer instances, caching at the further consumer instance data that is dispatched from the third number of the producer instances. With reference to the consumer instance 310 in FIG. 7, detailed illustration is now presented to concrete steps of this embodiment.

As shown in FIG. 7, data from the producer instances 210 and 212 is represented by rectangles 720 and 724 respectively. If the state migration has been completed, then according to the adjustment policy, a portion of the states that used to be at the consumer instance 220 will be migrated to the consumer instance 310, and a portion of the states that used to be at the consumer instance 222 will also be migrated to the consumer instance 310. At this point, since the state migration has not been completed, states at the consumer instance 310 do not meet a new distribution of states; if data was processed based on current states at the consumer instance 310, then the data would not be correctly processed.

In other words, although data (data 720, data 724) dispatched to the consumer instance 310 is dispatched according to the new distribution of the states, whereas the current distribution of the states at the consumer instance 310 fails to meet a new distribution, received data has to be cached at the consumer instance 310. Further, after the state migration is completed, the consumer instance 310 may process received data based on the new distribution.

As time goes on, the adjustment indicator 716 from the producer instance 212 arrives at the consumer instance 222. Then, at this point the consumer instance 222 receives adjustment indicators from all the upstream producer instances, so the state migration may be performed between the consumer instance 222 and the consumer instance 310.

Figure 8:
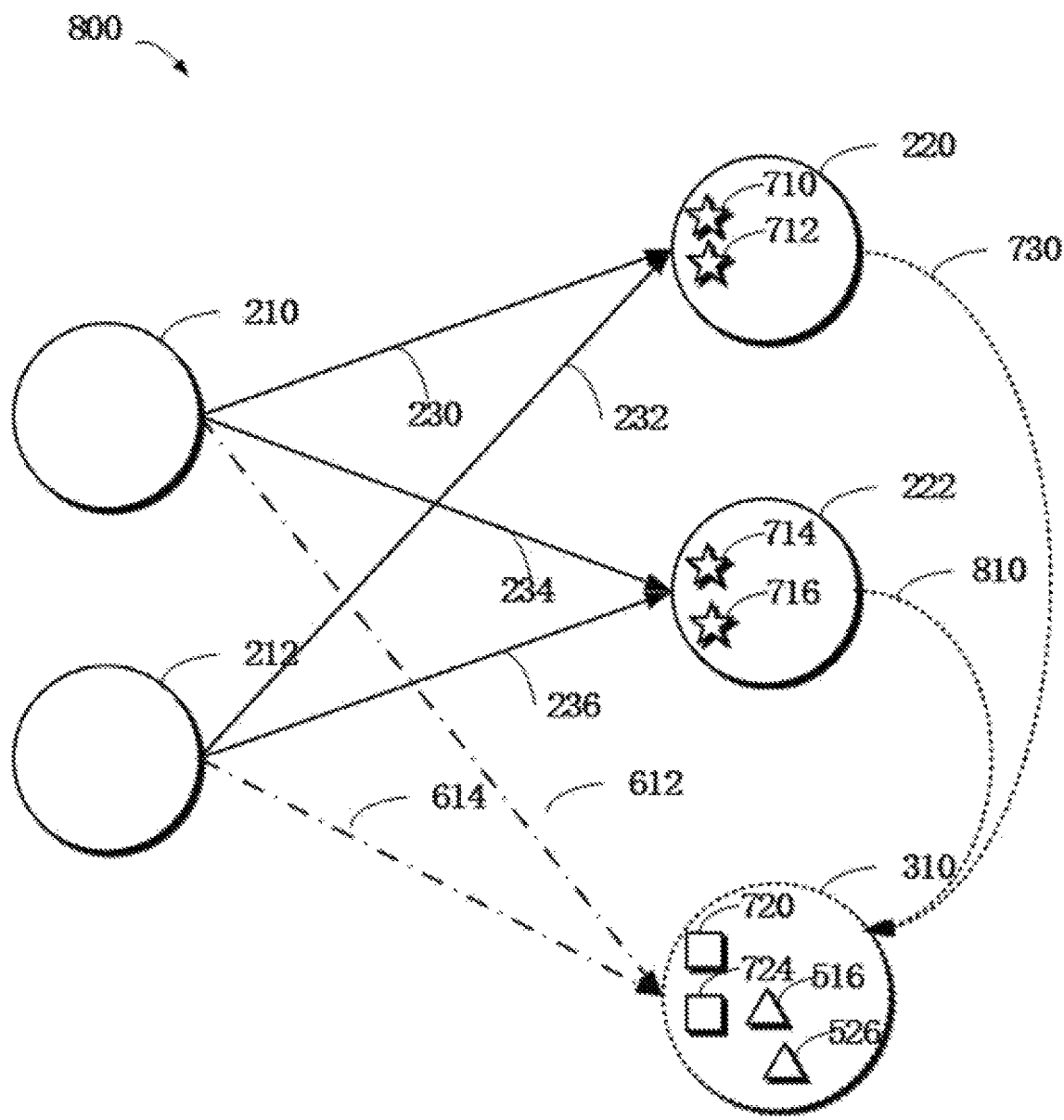

In one embodiment of the present invention, there is further comprised: in response to receiving, at the further consumer instance, the portion of the states from the consumer instance, processing the cached data based on the portion. With reference to FIG. 8, description is presented below to concrete details of this embodiment.

FIG. 8 schematically shows a refined block diagram 800 of the process of a method for processing data according to one embodiment of the present invention. As shown in FIG. 8, the respective adjustment indicators 710 and 712 from all the upstream producer instances 210 and 212 have arrived at the consumer instance 220, and subsequently the state 516 shown by a triangle is migrated from the consumer instance 220 to the consumer instance 310 along the arrow 730; the respective adjustment indicators 714 and 716 from all the upstream producer instances 210 and 212 have arrived at the consumer instance 222, and subsequently a state 526 shown by a triangle is migrated from the consumer instance 222 to the consumer instance 310 along an arrow 810. At this point, the state migration is completed, and the cached data 720 and 724 may be processed at the consumer instance 310 based on the states 516 and 526.

In one embodiment of the present invention, in response to determining that a workload for processing the data increases, an adjustment request is sent for increasing the number of the consumer instances from the first number to the second number; and in response to determining that a workload for processing the data decreases, an adjustment request is sent for decreasing the number of the consumer instances from the first number to the second number.

Note in this embodiment the adjustment request is determined based on a workload for processing the data, and in the context of the present invention it is not intended to limit the sizes of the first number and the second number, but the first number may be greater or less than the second number.

When the workload increases and more computing resources are required (e.g., from processing video collected during the night to processing video collected in the daytime), the number of consumer instances may be increased from the first number to the second number; when the workload decreases and less computing resources are required (e.g., from processing video collected in the daytime to processing video collected during the night), the number of consumer instances may be decreased from the first number to the second number.

Figure 9:
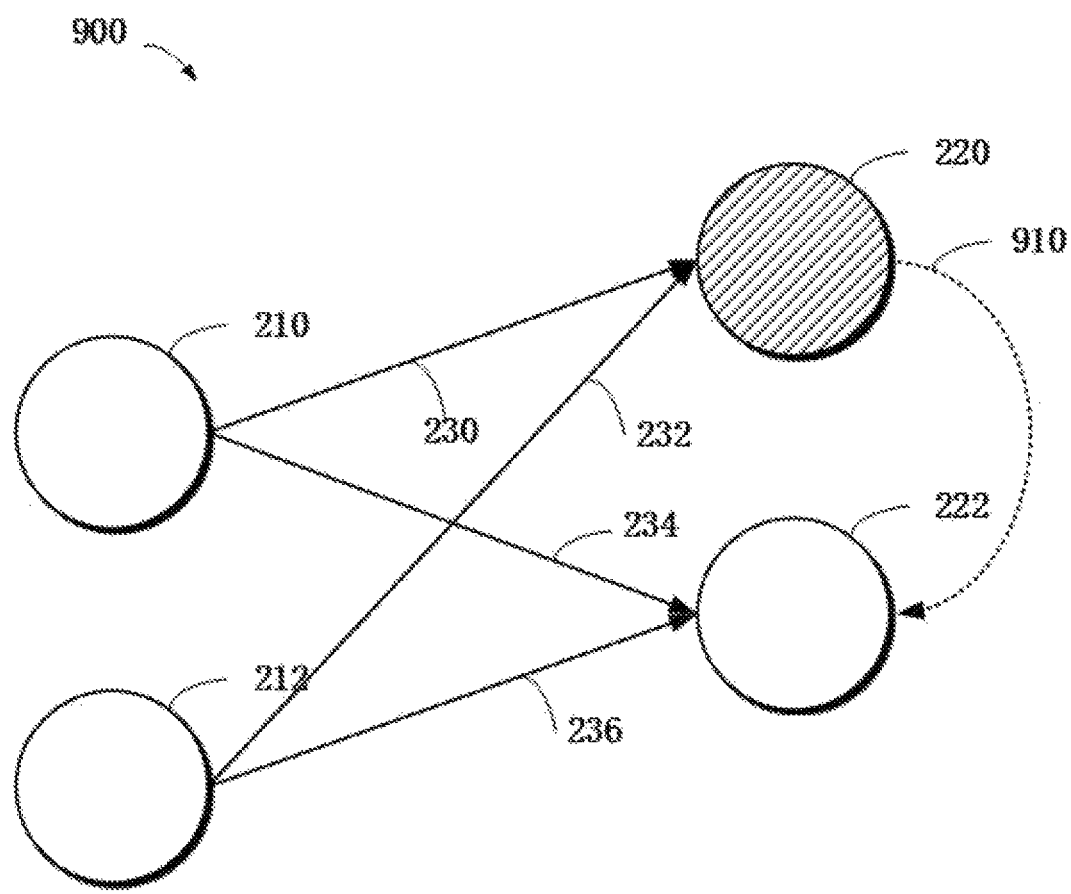

Concrete details of adding a consumer instance have been described in detail with reference to FIGS. 5A to 5C and FIGS. 6 to 8. In one embodiment of the present invention, when the workload for processing data decreases and less computing resources are required, the number of consumer instances may be decreased from the first number to the second number. In other words, some running consumer instances may be ceased. With reference to FIG. 9, detailed description is presented below to concrete details.

FIG. 9 schematically shows a refined block diagram 900 of the process of a method for processing data according to one embodiment of the present invention. In this embodiment, the number of consumer instances decrease from 2 to 1 (e.g., the consumer instance 220 will be ceased). At this point, the adjustment policy is to migrate a state at the consumer instance to the consumer instance 222 while not migrating a state at the consumer instance 222.

Figure 10A:
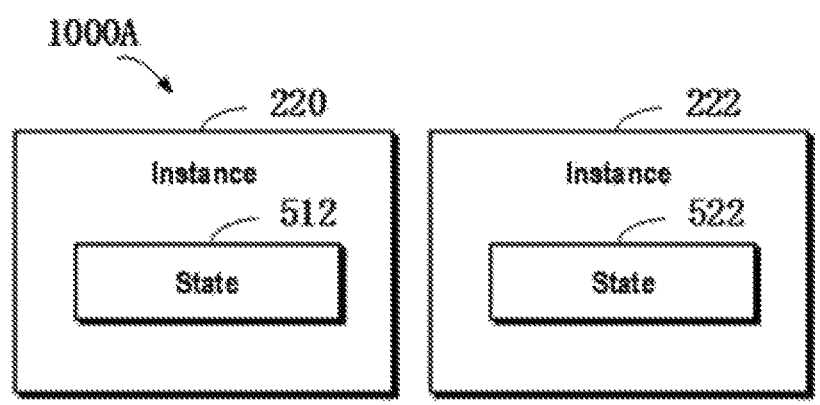
FIGS. 10A and 10B schematically illustrate schematic views of state migration according to the embodiment of the present invention as shown in FIG. 9.
Figure 10B:
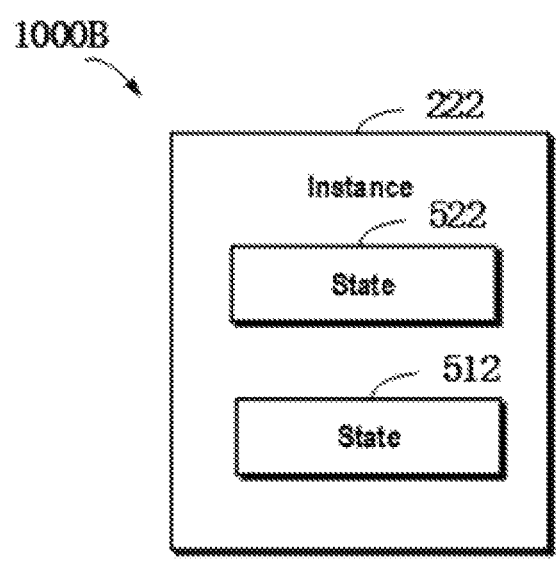

FIGS. 10A and 10B schematically shows schematic views 1000A and 1000b of the state migration according to the embodiment as shown in FIG. 9. As shown in FIG. 10A, a state 512 is at the consumer instance 220, and a state 522 is at the consumer instance 222. When the operation of the consumer instance 220 desires to be ceased, the state 512 at the consumer instance 220 needs to be migrated to the consumer instance 222. As shown in FIG. 10B, after the state migration is completed, the consumer instance 222 comprises the states 522 and 512.

Figure 11:
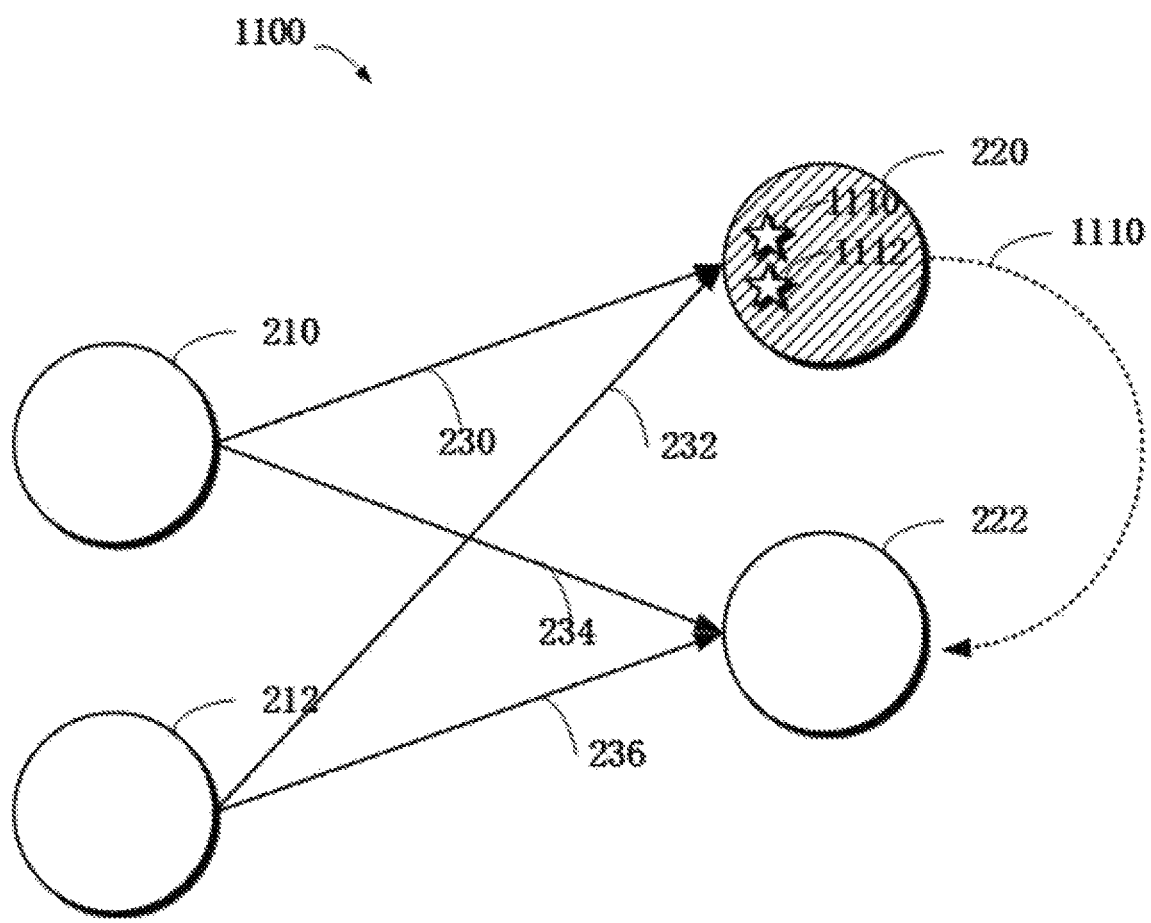
FIG. 11 schematically illustrates a refined block diagram of the process of a method for processing data according to one embodiment of the present invention.

With reference to FIG. 11, description is presented below to concrete details of decreasing the number of consumer instances from two to one (i.e., ceasing the consumer instance 220). FIG. 11 schematically shows a refined block diagram 1100 of the process of a method for processing data according to one embodiment of the present invention. First of all, the upstream producer instance 210 sends adjustment indicators to the two downstream consumer instances 220 and 222 along data channel 230 and 234 respectively, and the upstream producer instance 212 sends adjustment indicators to the two downstream consumer instances 220 and 222 along data channel 232 and 236 respectively. After the producer instances 210 and 212 send adjustment indicators, data is dispatched according to the new distribution of states. Since there is not any state at the consumer instance 220 after the state migration, the producer instances 210 and 212 no longer dispatch data to the consumer instance 220, but only dispatch data to the consumer instance 222. Dispatched data may be cached at the consumer instance 222.

At the consumer instance 220, when adjustment indicators 1110 and 1112 from all the upstream producer instances 210 and 212 arrive at the consumer instance 220, a state comprised at the consumer instance 220 (e.g., the state 512 shown in FIGS. 10A and 10B) will be migrated to the consumer instance 222 along an arrow 1110. After the state migration is completed, data cached at the consumer instance 222 may be processed based on the new distribution of the states. At this point, data that used to be processed by the consumer instance 220 has been dispatched to the consumer instance 222, and the state that used to be at the consumer instance 220 has been migrated to the consumer instance 222; then, the consumer instance 220 becomes irrelevant to the data processing and may be ceased accordingly.

A method for processing data has been described above. The method can, without ceasing to process data, dynamically adjust the number of operator instances that are involved in the data processing. According to the embodiments of the present invention, the number of operator instances may be dynamically adjusted based on the size of a workload for processing data. For example, the number of consumer instances can be increased or reduced dynamically. In this way, on the one hand the processing capacity may be increased so as to ensure real-time processing when the workload increases, and on the other hand the processing capacity that is no longer required may be released when the workload decreases.

Note although the example as depicted comprises two producer instances, in other embodiments there may exist only one producer instance. The above-mentioned "third number" of producer instances only involve one producer instance. Those skilled in the art may implement concrete operation steps in case of only one producer instance, according to the foregoing principles.

Specifically, take FIG. 7 as one example. When only the producer instance 210 is involved, it is just necessary that adjustment indicators are sent to the downstream consumer instances 220 and 222 along the communication channels 230 and 234. At this point, the consumer instances 220 and 222 each have only one upstream producer instance 210, and upon receiving an adjustment indicator from the upstream producer instance 210, each of the consumer instances may trigger the state migration associated with itself. For another example, in the example of reducing consumer instances as shown in FIG. 11, when only one producer instance 210 is involved, it is just necessary that adjustment indicators are sent to the downstream consumer instances 220 and 222 along the communication channels 230 and 234. At this point, upon receiving an adjustment indicator from the producer instance 210, the consumer instance 220 may trigger the state migration associated with itself.

Further note although description has been presented above to the example of one level producer-consumer processing process, when the data processing flow relates to multiple levels, those skilled in the art may implement concrete operation steps at each level based on the foregoing principles, which is ignored here.

Figure 12:
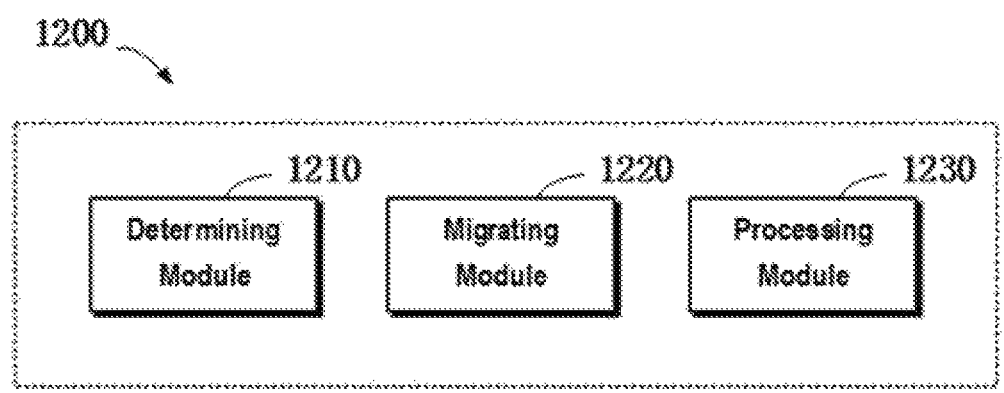
FIG. 12 schematically illustrates a block diagram of a device for processing data according to one embodiment of the present invention.

FIG. 12 schematically shows a block diagram 1200 of a device for processing data according to one embodiment of the present invention. Specifically, there is provided a device for processing data, comprising: a determining module 1210 configured to, in response to receiving an adjustment request for adjusting the number of consumer instances from a first number to a second number, determine an adjustment policy on adjusting a first distribution of states associated with the first number of consumer instances to a second distribution of the states associated with the second number of consumer instances, the states being intermediate results of processing the data; a migrating module 1220 configured to migrate the states between the first number of the consumer instances and the second number of the consumer instances according to the adjustment policy; and a processing module 1230 configured to process the data based on the second distribution of the states at the second number of the consumer instances.

In one embodiment of the present invention, the determining module 1210 is further configured to: determine migration overhead for adjusting the first distribution of the states to the second distributions of the states; and determine the adjustment policy based on the migration overhead.

In one embodiment of the present invention, the determining the migration overhead comprises: determining the migration overhead based on a consistent hashing algorithm.

In one embodiment of the present invention, the migrating module 1220 is further configured to: before migrating the states, at a third number of producer instances that is at upstream of the first number of consumer instances, send an adjustment indicator to the first number of the consumer instances, the adjusting indicator indicating that data dispatched after the adjustment indicator is dispatched according to the second distributions of the states.

In one embodiment of the present invention, the migrating module 1220 is further configured to: after sending the adjustment indicator, dispatch the data from the third number of producer instances to the second number of consumer instances according to the second distribution of the states.

In one embodiment of the present invention, the migrating module 1220 is further configured to: in response to receiving adjustment indicators from all upstream producer instances at a consumer instance among the first number of the consumer instances, migrate a relevant portion of the states to an associated further consumer instance among the second number of the consumer instances according to the adjustment policy.

In one embodiment of the present invention, the migrating module 1220 is further configured to: before receiving adjustment indicators from all upstream producer instances at the consumer instance, process the data at the consumer instance based on the first distribution of the states.

In one embodiment of the present invention, the migrating module 1220 is further configured to: before receiving adjustment indicators from all upstream producer instances at the consumer instance, cache at the further consumer instance data that is dispatched from the third number of the producer instances.

In one embodiment of the present invention, the migrating module 1220 is further configured to: in response to receiving at the further consumer instance the portion of the states that are migrated from the consumer instance, process the cached data based on the portion.

In one embodiment of the present invention, the determining module 1210 is further configured to: in response to determining that a workload for processing the data increases, send an adjustment request for increasing the number of the consumer instances from the first number to the second number, and in response to determining that a workload for processing the data decreases, send an adjustment request for decreasing the number of the consumer instances from the first number to the second number.

In one embodiment of the present invention, there is provided a system for processing data, comprising: one or more processors; a memory coupled to at least one processor of the one or more processors; computer program instructions stored in the memory which, when executed by the at least one processor, cause the system to execute a method for processing data, the method comprising: in response to receiving an adjustment request for adjusting the number of consumer instances from a first number to a second number, determining an adjustment policy on adjusting a first distribution of states associated with the first number of consumer instances to a second distribution of the states associated with the second number of consumer instances, the states being intermediate results of processing the data; migrating the states between the first number of the consumer instances and the second number of the consumer instances according to the adjustment policy; and processing the data based on the second distribution of the states at the second number of the consumer instances.

In one embodiment of the present invention, the determining the adjustment policy comprises: determining migration overhead for adjusting the first distribution of the states to the second distributions of the states: and determining the adjustment policy based on the migration overhead.

In one embodiment of the present invention, the determining the migration overhead comprises: determining the migration overhead based on a consistent hashing algorithm.

In one embodiment of the present invention, there is further comprised: before migrating the states, at a third number of producer instances that is at upstream of the first number of consumer instances, sending an adjustment indicator to the first number of the consumer instances, the adjusting indicator indicating that data dispatched after the adjustment indicator is dispatched according to the second distributions of the states.

In one embodiment of the present invention, there is further comprised: after sending the adjustment indicator, dispatching the data from the third number of producer instances to the second number of consumer instances according to the second distribution of the states.

In one embodiment of the present invention, the migrating the states according to the adjustment policy comprises: in response to receiving adjustment indicators from all upstream producer instances at a consumer instance among the first number of the consumer instances, migrating a relevant portion of the states to an associated further consumer instance among the second number of the consumer instances according to the adjustment policy.

In one embodiment of the present invention, there is further comprised: before receiving adjustment indicators from all upstream producer instances at the consumer instance, processing the data at the consumer instance based on the first distribution of the states.

In one embodiment of the present invention, there is further comprised: before receiving adjustment indicators from all upstream producer instances at the consumer instance, caching at the further consumer instance data that is dispatched from the third number of the producer instances.

In one embodiment of the present invention, there is further comprised: in response to receiving at the further consumer instance the portion of the states that are migrated from the consumer instance, processing the cached data based on the portion.

In one embodiment of the present invention, there is further comprised: in response to determining that a workload for processing the data increases, sending an adjustment request for increasing the number of the consumer instances from the first number to the second number; and in response to determining that a workload for processing the data decreases, sending an adjustment request for decreasing the number of the consumer instances from the first number to the second number.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for processing data, comprising:
receiving an adjustment request for adjusting a number of consumer instances from a first number to a second number;
determining an adjustment policy on adjusting a first distribution of states associated with the first number of consumer instances to a second distribution of the states associated with the second number of consumer instances, the states being intermediate results of processing the data;
migrating the states between the first number of the consumer instances and the second number of the consumer instances according to the adjustment policy; and
processing the data based on the second distribution of the states at the second number of the consumer instances; and
wherein the method further comprises:
before migrating the states, at a third number of producer instances that is at upstream of the first number of consumer instances, sending an adjustment indicator to the first number of the consumer instances, the adjusting indicator indicating that data dispatched after the adjustment indicator is dispatched according to the second distributions of the states.

2. The method according to claim 1, wherein the determining the adjustment policy comprises:
determining migration overhead for adjusting the first distribution of the states to the second distributions of the states; and
determining the adjustment policy based on the migration overhead.

3. The method according to claim 2, wherein the determining the migration overhead comprises: determining the migration overhead based on a consistent hashing algorithm.

4. The method according to claim 1, further comprising:
after sending the adjustment indicator,
dispatching the data from the third number of producer instances to the second number of consumer instances according to the second distribution of the states.

5. The method according to claim 1, wherein the migrating the states according to the adjustment policy comprises:
in response to receiving adjustment indicators from all upstream producer instances at a consumer instance among the first number of the consumer instances, migrating a relevant portion of the states to an associated further consumer instance among the second number of the consumer instances according to the adjustment policy.

6. The method according to claim 5, further comprising:
before receiving adjustment indicators from all upstream producer instances at the consumer instance, processing the data at the consumer instance based on the first distribution of the states.

7. The method according to claim 6, further comprising:
before receiving adjustment indicators from all upstream producer instances at the consumer instance, caching at the further consumer instance data that is dispatched from the third number of the producer instances.

8. The method according to claim 7, further comprising:
in response to receiving at the further consumer instance the portion of the states that are migrated from the consumer instance, processing the cached data based on the portion.

9. The method according to claim 1, further comprising any of:
in response to determining that a workload for processing the data increases, sending the adjustment request for increasing the number of the consumer instances from the first number to the second number; and
in response to determining that a workload for processing the data decreases, sending the adjustment request for decreasing the number of the consumer instances from the first number to the second number.

10. A system for processing data, comprising:
one or more processors;
a memory coupled to at least one processor of the one or more processors;
computer program instructions stored in the memory which, when executed by the at least one processor, cause the system to execute a method for processing data, the method comprising:
receiving an adjustment request for adjusting a number of consumer instances from a first number to a second number;
determining an adjustment policy on adjusting a first distribution of states associated with the first number of consumer instances to a second distribution of the states associated with the second number of consumer instances, the states being intermediate results of processing the data;
migrating the states between the first number of the consumer instances and the second number of the consumer instances according to the adjustment policy; and
processing the data based on the second distribution of the states at the second number of the consumer instances; and
wherein the method further comprises:
before migrating the states, at a third number of producer instances that is at upstream of the first number of consumer instances, sending an adjustment indicator to the first number of the consumer instances, the adjusting indicator indicating that data dispatched after the adjustment indicator is dispatched according to the second distributions of the states.

11. The system according to claim 10, wherein the determining the adjustment policy comprises:
determining migration overhead for adjusting the first distribution of the states to the second distributions of the states; and
determining the adjustment policy based on the migration overhead.

12. The system according to claim 11, wherein the determining the migration overhead comprises: determining the migration overhead based on a consistent hashing algorithm.

13. The system according to claim 10, wherein the method further comprises: after sending the adjustment indicator,
dispatching the data from the third number of producer instances to the second number of consumer instances according to the second distribution of the states.

14. The system according to claim 10, wherein the migrating the states according to the adjustment policy comprises:
receiving adjustment indicators from all upstream producer instances at a consumer instance among the first number of the consumer instances; and
migrating a relevant portion of the states to an associated further consumer instance among the second number of the consumer instances according to the adjustment policy.

15. The system according to claim 14, wherein the method further comprises:
before receiving adjustment indicators from all upstream producer instances at the consumer instance, processing the data at the consumer instance based on the first distribution of the states.

16. The system according to claim 15, wherein the method further comprises:
before receiving adjustment indicators from all upstream producer instances at the consumer instance, caching at the further consumer instance data that is dispatched from the third number of the producer instances.

17. The system according to claim 16, wherein the method further comprises:
in response to receiving at the further consumer instance the portion of the states that are migrated from the consumer instance, processing the cached data based on the portion.

18. The system according to claim 10, wherein the method further comprises:
in response to determining that a workload for processing the data increases, sending the adjustment request for increasing the number of the consumer instances from the first number to the second number; and
in response to determining that a workload for processing the data decreases, sending the adjustment request for decreasing the number of the consumer instances from the first number to the second number.

19. A computer program product having a non-transitory computer readable medium which stores a set of instructions to process data; the set of instructions, when carried out by computerized circuitry, causing the computerized circuitry to perform a method of:
receiving an adjustment request for adjusting a number of consumer instances from a first number to a second number;
determining an adjustment policy on adjusting a first distribution of states associated with the first number of consumer instances to a second distribution of the states associated with the second number of consumer instances, the states being intermediate results of processing the data;
migrating the states between the first number of the consumer instances and the second number of the consumer instances according to the adjustment policy; and
processing the data based on the second distribution of the states at the second number of the consumer instances; and
wherein the method further comprises:
before migrating the states, at a third number of producer instances that is at upstream of the first number of consumer instances, sending an adjustment indicator to the first number of the consumer instances, the adjusting indicator indicating that data dispatched after the adjustment indicator is dispatched according to the second distributions of the states.

20. The computer program product as in claim 19, wherein the computerized circuitry is constructed and arranged to dynamically adjust computing resources at runtime of a stream processing application which operates in accordance with a Directed Acyclic Graph (DAG) topology.

* * * * *